United States Patent [19]

Carella et al.

[11] Patent Number: 5,094,590
[45] Date of Patent: Mar. 10, 1992

[54] VARIABLE DISPLACEMENT COMPRESSOR WITH SHAFT END PLAY COMPENSATION

[75] Inventors: Thomas J. Carella, Niagara Falls; Bruce E. Hornung, Amherst, both of N.Y.

[73] Assignee: General Motors Corporation, Detroit, Mich.

[21] Appl. No.: 594,908

[22] Filed: Oct. 9, 1990

[51] Int. Cl.⁵ .............................. F04B 1/26; F01B 3/04
[52] U.S. Cl. .............................. 417/222 S; 417/222 R; 92/71; 92/12.2; 74/60
[58] Field of Search ............... 417/322 S, 222; 74/60; 92/71, 12.2

[56] References Cited

U.S. PATENT DOCUMENTS

| | | | |
|---|---|---|---|
| 3,861,829 | 1/1975 | Roberts et al. | 417/212 |
| 3,959,983 | 6/1976 | Roberts et al. | 62/226 |
| 4,073,603 | 2/1978 | Abendschein et al. | 417/222 |
| 4,105,370 | 8/1978 | Bruchen | 417/222 |
| 4,428,718 | 1/1984 | Skinner | 417/222 |
| 4,480,964 | 11/1984 | Skinner | 417/222 S |
| 4,586,874 | 5/1986 | Hiraga et al. | 417/270 |
| 4,606,705 | 8/1986 | Parekh | 417/222 S |
| 4,664,604 | 5/1987 | Terauchi | 417/222 |
| 4,737,079 | 4/1988 | Kurosawa et al. | 417/222 |
| 4,747,754 | 5/1988 | Fujii | 417/222 S |
| 4,801,248 | 1/1989 | Tojo | 92/12.2 |
| 4,815,358 | 3/1989 | Smith | 74/60 |
| 4,862,789 | 9/1989 | Burgess | 92/12.2 |
| 4,973,229 | 11/1990 | Oono | 92/12.2 |
| 4,979,877 | 12/1990 | Shimizu | 417/222 |

FOREIGN PATENT DOCUMENTS 0338726 7/1989 European Pat. Off. ............ 417/269

Primary Examiner—Richard A. Bertsch
Assistant Examiner—Peter Korytnyk
Attorney, Agent, or Firm—Ronald L. Phillips

[57] ABSTRACT

A variable displacement compressor having a rotary drive shaft coupled to a gas pressure positioned wobble plate carried by a drive mechanism including a drive journal and journal sleeve on the rotary drive shaft and a drive lug connected to the drive shaft having a slot operatively connected by a coupling pin to the journal. Thrust bearings located in the cylinder head and front head of the compressor axially position the drive mechanism within a gas pressured crankcase. The rear thrust bearing includes a race engaged by a coil spring on the shaft to provide relative axial movement between the shaft and the rear thrust bearing to compensate for end play between the thrust shoulders and the thrust bearings following assembly of the cylinder head and front head. The coil spring has a first predetermined biasing force when the wobble plate is in a full stroke position to maintain a minimum spring load on the thrust bearings to reduce wear during operation of the compressor at high air conditioning loads and the coil spring is shifted into a compressed position to provide an increased load on the thrust bearings in a direction to resist load reversals on the shaft when the compressor is operating under low air conditioning load conditions.

4 Claims, 3 Drawing Sheets

VARIABLE DISPLACEMENT COMPRESSOR WITH SHAFT END PLAY COMPENSATION

TECHNICAL FIELD

This invention relates to compressors and more particularly to compressors having a wobble plate connected to a rotary shaft by a drive mechanism which will adjust the inclination of the wobble plate with respect to the drive shaft in response to gas pressure conditions within a crankcase enclosing the drive mechanism.

BACKGROUND OF THE INVENTION

In variable displacement wobble plate compressors such as are used in motor vehicle air conditioning systems, it is common practice to provide a wobble plate which is connected to pistons by connecting rods in a manner which will produce reciprocation of the pistons within a cylinder head for compressing refrigerant vapors returned to the compressor from an evaporator for cooling air flow into the passenger compartment of the motor vehicle.

Such air conditioning systems have a condenser connected to the discharge of the compressor; a high pressure liquid refrigerant line connected from the condenser to an orifice tube for expanding the liquid refrigerant for flow through the evaporator to cool the air flow thereacross. Refrigerant vapor from the evaporator is directed through an accumulator dehydrator unit in the suction line to the compressor Such systems operate under various conditions including high vehicle speed operation when the compressor is driven at a constant high speed to produce a maximum displacement of refrigerant gas from the suction line to the discharge line for flow to the condenser. Other operating modes include driving the compressor at reduced speed when the engine is idling during which time the compressor displacement is reduced.

Additionally, when the ambient air is hot and humid a high demand load is placed on the evaporator which can cause the suction pressure of the compressor to increase. When the air is cool, the demand load on the air conditioning system will be low which can cause the suction pressure of the compressor to decrease.

U.S. Pat. No. 4,428,718 discloses a wobble plate whose stroke position is controlled by a combination of suction pressure and discharge pressure in the compressor. In order to adjust the compressor displacement to changes in load on the air conditioning system, the wobble plate has its inclination varied with respect to the drive shaft so as to change the piston stroke in the cylinder head in accordance with the suction pressure of the compressor. The change in inclination is made by changing the pressure in the crankcase of the compressor to reflect the changes in the air conditioning load which are indicated by changes in the suction pressure of the compressor. When a higher suction pressure exists, a pressure sensing valve closes off discharge pressure from the compressor into the crankcase. A pressure balance thereby is produced across the pistons which in turn impose a gas pressure moment on the wobble plate to shift it into a maximum inclination at which the pistons will be fully stroked within the cylinder bores to produce a maximum gas compression displacement from the compressor. Resultant larger quantities of refrigerant flow through the condenser and the evaporator to meet the increased demand placed on the air conditioning system. When the load on the air conditioning system is reduced, the operating condition is reflected as a lower compressor suction pressure. The pressure sensing valve allows discharge pressure into the crankcase so as to increase the pressure in the crankcase. Accordingly, the gas induced moment on the wobble plate is reversed to cause it to assume a destroke position with a small inclination with respect to the drive shaft. Consequently, there is less piston stroke and less refrigerant flow through the air conditioning system.

Other variable capacity compressors are known including U.S. Pat. Nos. 3,861,829; 3,959,983 and 4,073,603 which utilized piston blowby gas flow to the crankcase and control of gas discharge pressure flow to the crankcase to vary the gas moment on the wobble plate.

Still other variable capacity compressors are shown in U.S. Pat. Nos. 4,486,874; 4,737,079 and European Specification EPO 0338762 October, 1989 in which a coil spring is supported between a wobble plate sleeve and the shaft to impose a return force on the wobble plate to shift it from its destroke position to a full stroke position when the gas moment is reversed on the wobble plate. Such coil springs, however, are not arranged to provide a low level spring force between thrust bearings to compensate for shaft end play during assembly of the shaft between a cylinder head and a front head of the compressor. Furthermore, such coil springs are not operative to provide a magnitude of spring bias on a drive shaft to counteract load reversals imposed on the drive shaft during operation at a low air conditioning demand condition.

In the compressor shown in U.S. Pat. No. 4,428,718, the drive shaft is held between the cylinder head and a front head which are joined following assembly of the wobble plate and drive mechanism on the drive shaft and placement of the individual pistons in the bores of the cylinder head. In the past in order to assemble such components clearance was provided between the thrust shoulders of the drive shaft and supporting thrust bearings for the drive shaft such that a small end play remained following assembly. The drive shaft in the '718 compressor may have a load reversal imposed thereon as the shaft rotates during operation of the system only under a low air conditioning demand mode of operation in which the wobble plate is located in its destroke position. Such load reversals act on the shaft to cause it to move fore and aft between the cylinder head and the front head of the compressor causing a chucking noise which is sometimes objectionable.

SUMMARY OF THE PRESENT INVENTION

The present invention solves the noise problem caused by fore and aft shaft movement by the provision of an improved shaft support assembly which takes up shaft end play during the initial assembly of cylinder head and front head components of the compressor while producing a spring biasing force on the shaft which will counteract load reversals on the shaft to prevent opposite shifting movements of the shaft as the wobble plate has gas force imbalances imposed thereon during a low air conditioning demand mode of operation.

The shaft support assembly is associated with a shaft mounted wobble plate having gas induced moments thereon. The shaft support assembly includes a coil compression spring that is supported on the shaft between a first thrust shoulder thereon and the axially moveable race of an inboard or rear thrust bearing. The inboard thrust bearing is supported by the cylinder head. The shaft support assembly further includes an outboard or front thrust bearing in a front head. The axially moveable race of the inboard thrust bearing is moved by the coil compression spring to compensate for shaft end play when the wobble plate, drive mechanism and drive shaft are assembled between the cylinder head and the front head by axially positioning the front head in assembled relationship on the cylinder head.

In another embodiment of the invention the shaft support assembly has a coil spring supported on the shaft between a first thrust shoulder thereon and an inboard thrust bearing in the cylinder head. The inboard thrust bearing has a bearing sleeve press fit on a land portion at the inboard end of the drive shaft with two axial extensions forming a track and a radial bearing race supported on the land portion having slots therein for receiving the axial extensions to guide the radial bearing race for a axial movement with respect to the land portion to compensate for shaft end play while preventing rotation of the radial bearing race with respect to the coil spring.

An object of the present invention is to provide a new and improved easily assembled shaft support system for a variable displacement wobble plate compressor which will compensate for shaft end play during assembly of the drive shaft and associated wobble plate and wobble plate drive mechanism within the crankcase of the compressor and which will direct a reduced biasing force on thrust bearings at either end of the shaft during full stroke operation of the compressor, while operative to produce a greater biasing force on the thrust bearings during a destroke operation of the compressor so as to counteract load reversals imposed on the drive shaft as the wobble plate is rotated during operation under a low air conditioning demand condition of operation.

A further object of the present invention is to improve a variable displacement wobble plate compressor with a drive shaft subjected to load reversals only under a low air conditioning demand mode of operation by providing a drive shaft support system for counteracting the load reversals on the drive shaft so as to prevent fore and aft drive shaft oscillations and the noise attendant thereto.

A further object of the present invention is to provide a variable displacement wobble plate compressor with a drive shaft subjected to load reversals thereon by a wobble plate during a low air conditioning demand mode of operation, and in which a drive shaft support system is provided that will counteract load reversals on the drive shaft so as to prevent fore and aft drive shaft movements and the noise attendant thereto, and in which the drive shaft support system further includes a coil spring which cooperates with a rear thrust bearing having a race supporting the shaft and relatively axially moveable therewith to compensate for shaft end play during assembly of the cylinder head and front head of the compressor, and wherein the coil spring is operative during full stroke compressor operation to produce a reduced spring biasing force on the thrust bearings for the shaft to minimize thrust bearing wear, and wherein the coil spring is compressed by a journal sleeve when the compressor is destroked to impose a larger spring biasing force on the shaft which will counteract load reversals on the shaft so as to maintain it continuously engaged with a front thrust bearing in the front head of the compressor.

Yet another object of the present invention is to provide such a shaft support system in a wobble plate compressor wherein the drive shaft has an intermediate shaft segment carrying the wobble plate and a drive mechanism for the wobble plate including a slotted drive lug connected to the drive shaft and a drive journal connected to the wobble plate and wherein the journal is carried by a pivot pin surface of a journal sleeve. The journal sleeve serves as a bearing for adjusting the inclination of the wobble plate with respect to the shaft for changing the piston stroke of the wobble plate compressor. The wobble plate will assume a lesser inclined destroke position when the gas pressure in the crankcase is increased. The journal sleeve is moved to a position in which it compresses the coil spring to produce a greater spring bias between the shaft and the front thrust bearing. The front thrust bearing engages one of the thrust shoulders at all times and the rear thrust bearing engages the coil spring for supporting the other thrust shoulder for imposing a minimal spring biasing force on the thrust bearings when the wobble plate is in its full stroke position; the coil spring is engaged by the journal sleeve when the wobble plate is in its destroke position to produce an increased spring biasing force on the shaft in the direction of the front thrust bearing to counteract load reversals on the drive shaft as the wobble plate is driven to compress gas under a low air conditioning demand mode of operation. Such biasing force has a magnitude that will continually bias the shaft against the front thrust bearing so as to prevent fore and aft movements of the shaft to eliminate attendant objectional noise. In the preferred embodiment, the journal sleeve is coupled to the drive journal by pivot pins to allow relative fore and aft tipping movement therebetween while the journal sleeve shifts axially on the drive shaft from a position in contact with a front thrust bearing when the wobble plate is positioned in a full stroke inclined position with respect to the drive shaft when a first gas induced moment is imposed on the wobble plate.

These and other objects, advantages and features of the present invention will become more apparent from the following description and drawing in which:

DETAILED DESCRIPTION OF THE PREFERRED EMBODIMENT

Figure 1:
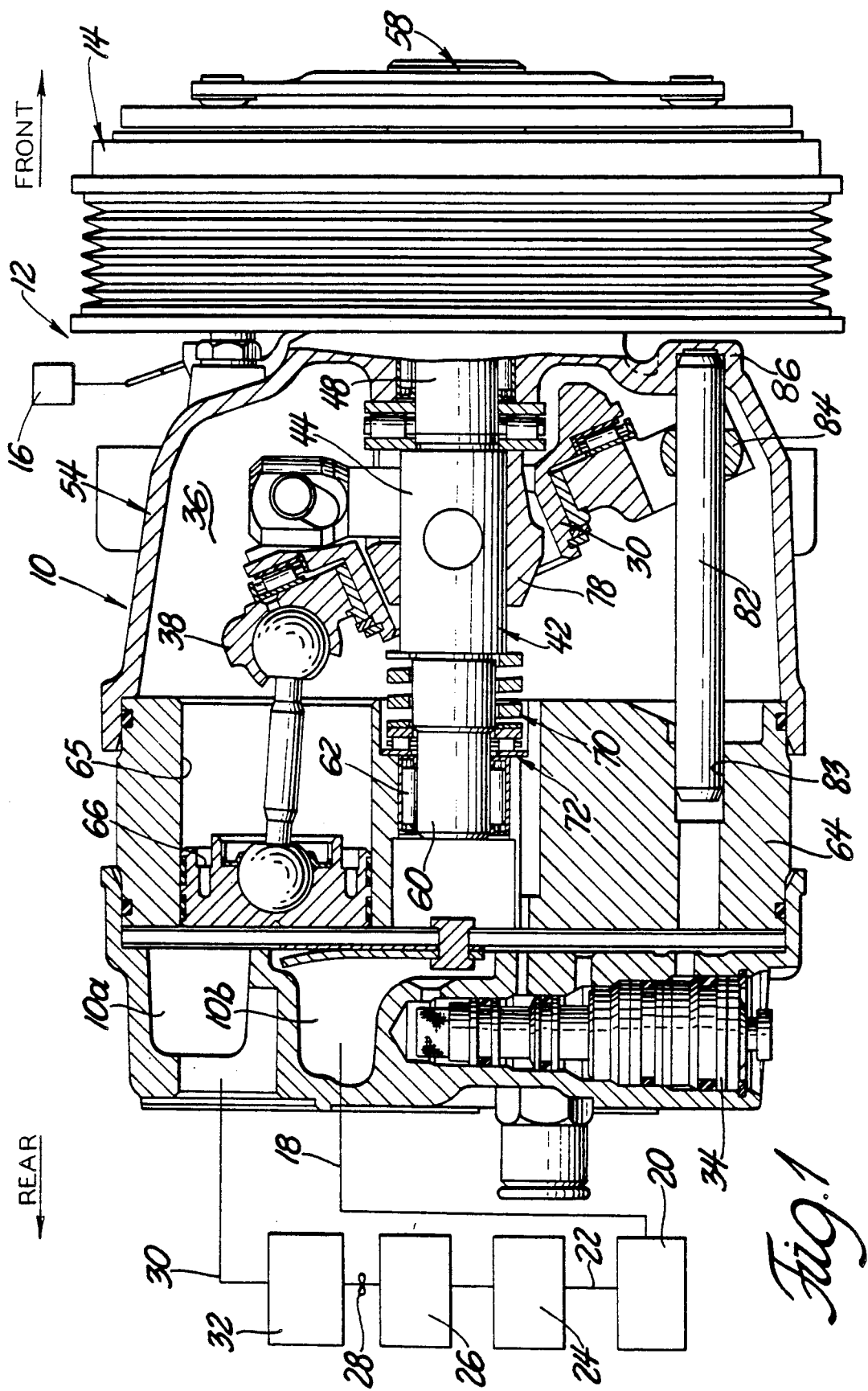
FIG. 1 is a side view, partially in elevation and partially sectioned of a variable displacement wobble plate compressor including the shaft support system of the present invention.

Referring now to FIGS. 1-4, a preferred embodiment of the shaft support system according to the present invention is shown incorporated in a variable displacement compressor like that disclosed in U.S. Pat. No. 4,428,718, assigned to the assignee of this invention and which is hereby incorporated by reference.

For purposes of understanding the present invention the compressor 10 is shown in association with a motor vehicle air conditioning system 12. In order to avoid placing an intermittent load on the vehicle engine the compressor is driven by a magnetic clutch 14 which is maintained energized at all times when a control 16 for the air conditioning system is turned on. The air conditioning system 12 includes a discharge line 18 connected from the compressor 10 for directing hot compressed refrigerant gas therefrom to a condenser 20. The condenser 20 is of the type located in a forward location of a motor vehicle so as to have ram air directed thereacross during high speed vehicle operation when the compressor is driven at high speed by the vehicle engine. The condenser 20 also has air directed thereacross by the cooling fan of the vehicle used to draw air across the coolant radiator of a vehicle having a front engine drive.

The condenser 20 thereby cools and condenses the hot refrigerant discharged from the compressor 10. High pressure liquid refrigerant is passed through a high pressure liquid refrigerant line 22 connected to the outlet of the condenser. A restriction device or orifice tube 24 in conduit 22 serves to expand the high pressure refrigerant and direct low pressure refrigerant liquid into an evaporator 26. A circulating fan 28 directs air across the evaporator 26 for cooling the air and directing the air into the passenger compartment of the motor vehicle.

The evaporator 26 has its outlet connected to a suction line 30 to the suction inlet of the compressor 10 and the suction line 30 includes an accumulator dehydrator 32.

The air conditioning system 12 includes many operative modes, two of which are important to this invention. In one of the modes a high demand is placed on the system when the ambient air is at an elevated temperature. Under such an operating mode, the system 12 is operated to direct large quantities of refrigerant from the compressor 10 by locating the wobble plate thereof in a maximum stroke position in which the wobble plate is inclined at a large angle to the drive shaft of the compressor 10. Under this mode of operation, the evaporator 26 has hot air directed thereacross and the suction pressure at the suction cavity 10a of the compressor 10 will remain relatively elevated. The greater suction pressure level will condition a suction pressure responsive bypass valve 34 to close off discharge pressure from the discharge cavity 10b of the compressor 10 to the crankcase 36 of the compressor 10 as more fully described in the '718 patent. This causes the pressure in the crankcase 36 to be regulated to produce a moment on a wobble plate 38 causing it to assume a full stroke position as shown in FIG. 1. For purposes of the present invention, it should be understood that other forms of control can be incorporated in place of bypass valve 34 so long as they are operative to change the crankcase pressure in a manner that will produce moments on the wobble plate to shift it between the full stroke position of FIG. 1 to the destroke position of FIG. 5.

When the air conditioning demand is low, the air passed across the evaporator 26 is cooler. This causes less refrigerant to evaporate and the suction pressure in the suction cavity 10a of the compressor 10 is reduced.

Figure 5:
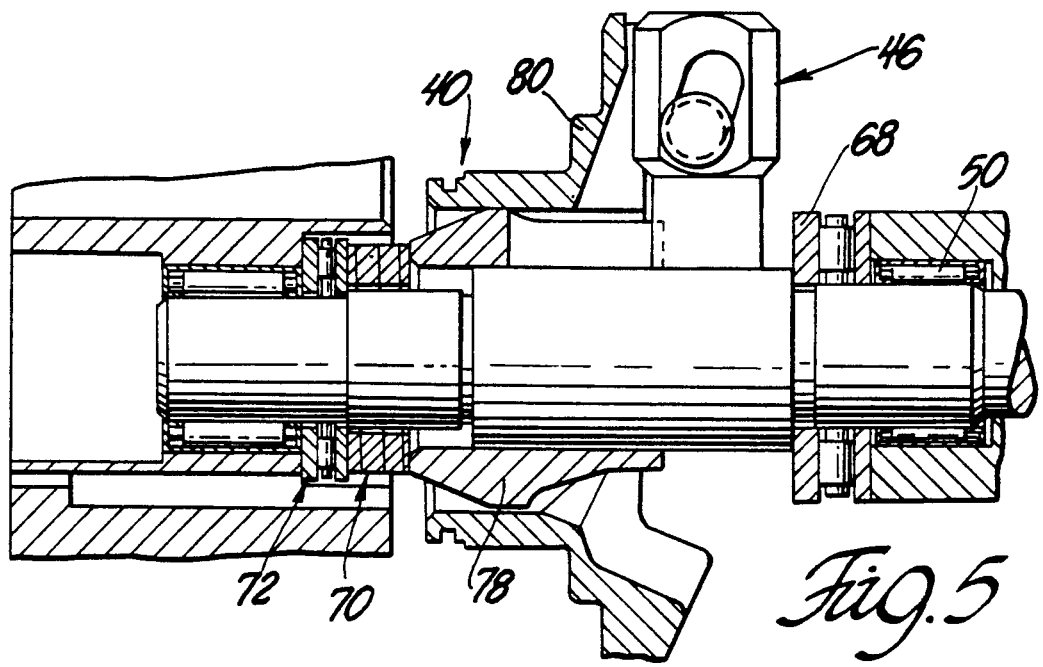
FIG. 5 is a side view like FIG. 2 showing the compressor in a destroked position for biasing a coil spring in the support system to reduce the output capacity of the compressor.

The lesser suction pressure is sensed by the bypass valve 34; bypass valve 34 is operative to cause more discharge pressure to bypass into the crankcase 36 to produce a pressure differential across compressor pistons which in turn will reverse the gas induced moment acting on the wobble plate 38 to cause it to assume the destroke position shown in FIG. 5. In the destroke position the piston stroke is reduced to reduce the compression chamber displacement so as to impose a smaller load on the drive engine of the motor vehicle.

Figure 2:
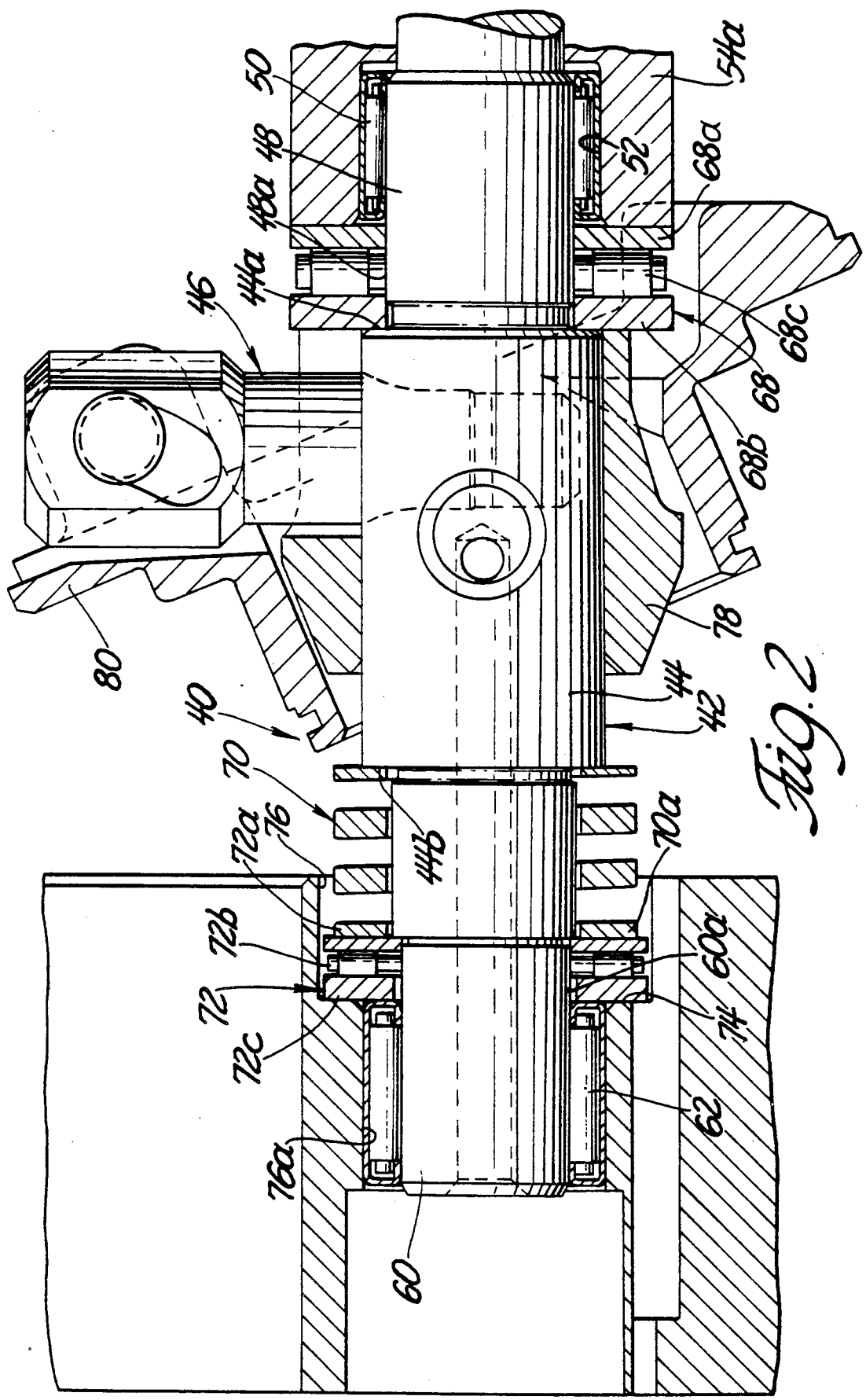
FIG. 2 is an enlarged side view of the shaft support system of the present invention partially sectioned and partially in elevation.

As best seen in FIG. 2, the shaft support system 40 of the present invention includes a drive shaft 42 having an intermediate shaft segment 44 that is connected to a drive mechanism 46 for the wobble plate 38. The drive shaft 42 further includes a front shaft extension 48 which is supported by a radial support bearing 50 in a bore 52 in the front head 54a of a compressor housing 54 which forms the crankcase 36. The shaft extension 48 is directed through the front head 54a where it is connected to the output mechanism 58 of the magnetic clutch 14. A rear shaft extension 60 is supported by a radial support bearing 62 in a cylinder head 64 at the opposite end of the crankcase 36. Cylinder head 64 has a plurality of piston bores 65, each supporting a piston 66 for reciprocation therein, as illustrated in FIG. 1.

In accordance with one aspect of the present invention, the intermediate shaft segment 44 has a front thrust shoulder 44a and a rear thrust shoulder 44b. The thrust shoulder 44a is continuously located in engagement with a front thrust bearing 68. The front thrust bearing 68 includes a bearing race 68a supported on an outer diameter 48a of the shaft extension 48 immediately inboard of the radial support bearing 50. The thrust bearing 68 further includes a bearing race 68b which engages the thrust shoulder 44a to hold a plurality of roller bearing pins 68c against the bearing race 68a.

The rear thrust shoulder 44b is located in engagement with one end of a coil compression spring 70 having the opposite end thereof in engagement with a rear thrust bearing 72. The rear thrust bearing 72 includes an axially moveable, radially directed race 72a which engages an inboard ground end 70a of the coil spring 70. The axially moveable, radially directed race 72a is supported on the outer peripheral surface 60a of the shaft extension 60 for relative axial movement therebetween to compensate for shaft end play. The race 72a has a diameter corresponding to the length of roller pins 72b of the thrust bearing 72 to hold them against a race 72c. Race 72c is held against the end surface 74 of a cylinder counterbore 76 and the front end of radial bearing 62. The cylinder counterbore 76 supports the radial bearing at a small diameter portion 76a of the counterbore 76. The thrust bearing 72 is supported at the diameter portion of counterbore 76. The assembled cylinder head 64 and front head 54a have clearance between the end thrust bearings for the shaft to allow for tolerance differences in the assembled parts. In the past, such clearances resulted in shaft end play which, over time, could affect the performance and wear characteristics of the thrust bearings. In accordance with the present invention, the provision of a coil spring 70 connected between the shoulder 44b and the rear thrust bearing 72 eliminates the shaft end play problem. More specifically, the spring 70 adjusts the relative axial position between race 72a and shaft extension 60 either toward or away from the end surface 74 to compensate for resultant end play and to assure that the shaft 42 will be held firmly between the thrust bearings 68 and 72 after the front head 54 is assembled.

In accordance with certain other principles of the present invention, the coil spring 70, in addition to compensating for shaft end play, also is configured to direct a minimal spring force against the shaft 42 to hold the front shoulder 44a against the front thrust bearing 68. The rear thrust bearing 72 is maintained loaded at the same level. Consequently, roller pins 68c and roller pins 72b are loaded under a minimal force. The minimal force is maintained when the wobble plate 38 is in its maximum inclined position shown in FIG. 1. Such operation occurs during periods when the compressor is operating under high demand conditions, e.g., hot humid days when hot ambient air is directed across the evaporator 26. As a result there is reduced thrust bearing wear over most of the operating life of the compressor 10.

The drive mechanism 46 includes a sleeve 78 axially slideable on the outer surface of the intermediate portion 44 of the shaft 42. The sleeve 78 is coupled to a drive journal 80 by a pair of pivot pins (not shown) to allow the drive journal 80 to tilt for and aft with respect to the shaft 42 when the gas moment is reversed on the wobble plate 38 as described in more detail in U.S. Pat. No. 4,428,718. While the shaft support system 40 of the present invention is discussed with respect to a gas moment system of the type shown in the aforesaid '718 patent it is equally suitable for use with other systems for changing the gas force on a wobble plate to change its inclination with respect to a drive shaft for controlling a compressor to have a variable output displacement.

The wobble plate 38 is guided in its fore and aft tilting movement by a guide pin 82 which has one end seated in a bore 83 in the cylinder head 64 and the opposite end seated in a bore 86 in the front head 54. The guide pin 82 prevents the wobble plate 38 from rotating with respect to the drive shaft. It allows tilting to change the angularity of the wobble plate 38 with respect to the drive shaft 42 by a ball guide 84 interposed between the wobble plate 38 and the guide pin 82. The ball guide 84 is slidably mounted on the guide pin 82 to move axially therealong as the wobble plate 38 tilts on the outer surface of the ball guide 84 as the drive mechanism 46 is shifted between the full stroke position of the wobble plate 38 shown in FIG. 1 to the destroke position of the wobble plate 38 shown in FIG. 5.

In another aspect of the present invention, when the variable displacement compressor 10 is in its destroke position shown in FIG. 5, the sleeve 78 is moved rearwardly to engage the coil spring 70 and cause it be more compressed on the shaft 42. The compression of the coil compression spring 70 raises its force to a point which will produce a resultant forwardly directed spring bias on the shaft 42 which will counteract load reversals which appear on the shaft 42 only during operation of the compressor under a low air conditioning demand mode of operation. In one working embodiment the compressed coil spring 70 produces a biasing force of between 50-110 pounds of force. The force directs the shaft 42 toward the front thrust bearing 68 and will hold the front thrust shoulder 44a of the drive shaft 42 continuously biased against the front thrust bearing 68 during such low demand operation by counteracting load reversals on the shaft 42 which would otherwise shift the shaft fore and aft within the crankcase 36 thus causing a chucking noise during the low demand phase of operation. During the high demand operation the spring 70 continues to bias the shaft 42 to the front but at a lesser force level to minimize bearing wear as discussed above.

Figure 3:
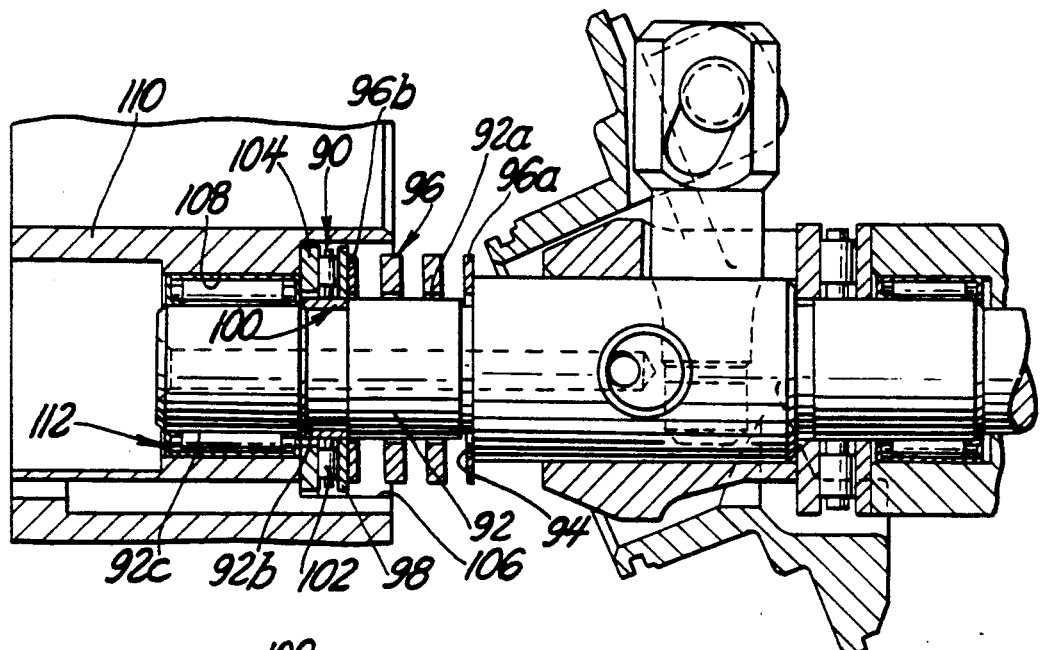
FIG. 3 is a view like FIG. 2 of another embodiment of the invention.
Figure 4:
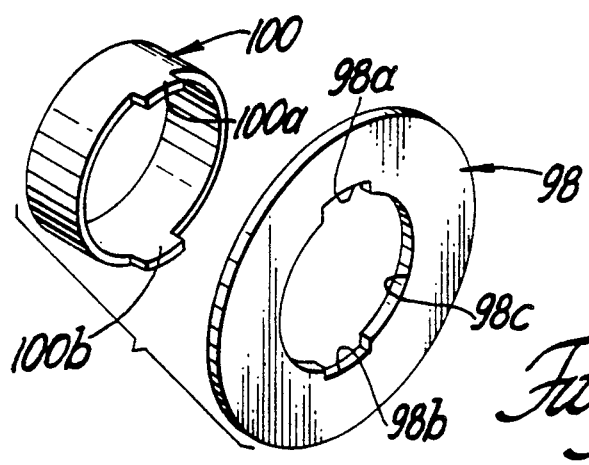
FIG. 4 is an exploded elevational view of thrust bearing components used in the shaft support system of the present invention.

Referring now to the embodiment of the invention illustrated in FIGS. 3 and 4, a rear bearing assembly 90 is illustrated which supports a rear shaft extension 92 of a drive shaft adapted to be connected to a drive mechanism and wobble plate as previously described with respect to the embodiment of FIGS. 1 and 2. In this embodiment, the rear extension has three stepped diameters 92a, 92b and 92c which are progressively smaller from a rear thrust shoulder 94 of the drive shaft to the tip of the rear shaft extension 92. In this embodiment a coil spring 96 surrounds the shaft at the diameter 92a thereon. The coil spring 96 has a front coil 96a ground to a flat which engages the thrust shoulder 94. The rear coil 96b of the coil spring 96 is likewise ground. The ground rear coil 96b is seated on the rear radial race 98 of the front thrust bearing 90. The rear radial race 98 is slidably supported for axial movement relative to the outer periphery of a sleeve 100 press fit on the shaft extension 92 at the diameter 92b thereof. The race 98 is held by the coil spring 96 against bearing pins 102 which are in turn in engagement with a rear radial race 104 supported within a bore 106 from the radial bearing bore 108 of a cylinder head 110 like cylinder head 64 in the first embodiment. The diameter 92c of the extension 92 is supported by a radial bearing 112 in bore 108. In this embodiment, end play in the drive shaft is compensated when the housing parts are assembled by relative axial movement between the shaft extension 92 and the thrust bearing 90. More particularly, as best shown in FIG. 4, the sleeve 100 has two diametrically located tabs or axial extensions 100a, 100b thereon which are received within two spaced slots 98a, 98b in the radial race 98. The inside diameter surface 98c of the race 98 is greater than the outer diameter of the sleeve 100 so as to allow relative axial movement therebetween. The tabs 100a, 100b interlock the sleeve 100 and the race 98 so as to cause the race 98 to be locked against rotation with respect to the coil spring 96. In this embodiment the sleeve 78 will compress the coil spring 96 to produce an elevated spring bias force that will counteract load reversals on the shaft during low demand air conditioning operation. The coil spring 96 will be extended during high demand air conditioning operation into the position shown in FIG. 3 to maintain a biasing force on the thrust bearings but on a magnitude to compensate for end play without overloading the thrust bearings.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. In a variable capacity compressor having a wobble plate and a drive mechanism including an axially moveable sleeve on the drive shaft for coupling the wobble plate to a drive shaft supported between a cylinder head and a front head joined together to form a crankcase for the drive mechanism and in which pressure is controlled in response to operating conditions within an associated vehicle air conditioning system; the air conditioning system having a high demand mode of operation in which the crankcase pressure is controlled to cause the wobble plate to assume a full stroke position with respect to the drive mechanism and the drive shaft and the air conditioning system further having a low demand mode of operation in which the crankcase pressure is controlled to cause the wobble plate to assume a destroke position in which the compressor displacement is reduced the improvement comprising:

a shaft support assembly including spring means for resiliently supporting the drive shaft between the cylinder head and the front head;

said shaft support assembly including a front thrust bearing located in the front head and a rear thrust bearing and a rear radial bearing located in the cylinder head; said shaft having an intermediate portion thereon including a rear thrust shoulder and a front thrust shoulder;

said front thrust bearing having a radial race in contact with said front thrust shoulder during all modes of compressor operation and in contact with said sleeve when the wobble plate is in its full stroke inclination with respect to said drive shaft;

said shaft having a rear extension with first and second diameters; said first diameter supported within said rear radial bearing and said rear thrust bearing;

said rear thrust bearing having a radially directed race supported on said first diameter for relative axial movement therebetween; said radially directed race engaging said shaft at said second diameter to hold said rear thrust bearing between said shaft and the cylinder head;

said spring means including a single coil spring surrounding said shaft and having one end thereof in engagement with said rear thrust shoulder and having the opposite end thereof in engagement with said radially directed race;

said coil spring and said rear thrust bearing being operatively associated to provide relative axial movement between said shaft and said rear thrust bearing to shift said drive shaft in a direction toward said front thrust bearing when the cylinder head and the front head are assembled to compensate for shaft end play and to direct a minimal spring bias on said front and rear thrust bearings during periods when the wobble plate is in its full stroke position.

2. In a variable capacity compressor having a wobble plate and a drive mechanism for coupling the wobble plate to a drive shaft supported between a cylinder head and a front head joined together to form a crankcase for the drive mechanism and in which pressure is controlled in response to operating conditions within an associated vehicle air conditioning system; the air conditioning system having a high demand mode of operation in which the crankcase pressure is controlled to cause the wobble plate to assume a full stroke position with respect to the drive mechanism and the drive shaft and the air conditioning system further having a low demand mode of operation in which the crankcase pressure is controlled to cause the wobble plate to assume a destroke position in which the compressor capacity is reduced the improvement comprising:

a shaft support assembly including spring means for resiliently supporting the drive shaft between the cylinder head and the front head;

said shaft support assembly including a front thrust bearing located in the front head and a rear thrust bearing and a rear radial bearing located in the cylinder head; said shaft having an intermediate portion thereon including a rear thrust shoulder and a front thrust shoulder;

said front thrust bearing having a radial race in contact with said front thrust shoulder during all modes of compressor operation;

said shaft having a rear extension with first and second diameters; said first diameter supported within said rear radial bearing and said rear thrust bearing;

said rear thrust bearing having a radially directed race supported on said first diameter for relative axial movement therebetween; said radially directed race engaging said shaft at said second diameter to hold said rear thrust bearing between said shaft and the cylinder head;

said spring means including a single coil spring surrounding said shaft and having one end thereof in engagement with said rear thrust shoulder and having the opposite end thereof in engagement with said radially directed race;

said spring means including a single coil spring surrounding said shaft and having one end thereof in engagement with said rear thrust shoulder and having the opposite end thereof in engagement with said rear thrust bearing;

said coil spring and said rear thrust bearing being operatively associated to provide relative axial movement between said shaft and said rear thrust bearing to shift said drive shaft in a direction toward said front thrust bearing when the cylinder head and the front head are assembled to compensate for shaft end play and to direct a minimal spring bias on said front and rear thrust bearings during periods when the wobble plate is in its full stroke position; and said drive mechanism including a sleeve moveable axially on said shaft for compressing said coil spring when the wobble plate is in its destroke position under low demand air conditioning operation to direct a spring bias against said shaft of a magnitude to counteract load reversals imposed on said shaft when the compressor is operated under a low demand mode of air conditioning operation.

3. In a variable capacity compressor having a wobble plate and a drive mechanism including an axially moveable sleeve on the drive shaft for coupling the wobble plate to a drive shaft supported between a cylinder head and a front head joined together to form a crankcase for the drive mechanism and in which pressure is controlled in response to operating conditions within an associated vehicle air conditioning system; the air conditioning system having a high demand mode of operation in which the crankcase pressure is controlled to cause the wobble plate to mechanism and the drive shaft and the air conditioning system further having a low demand mode of operation in which the crankcase pressure is controlled to cause the wobble plate to assume a destroke position in which the compressor displacement is reduced the improvement comprising:

a shaft support assembly including spring means for resiliently supporting the drive shaft between the cylinder head and the front head;

said shaft support assembly including a front thrust bearing located in the front head and a rear thrust bearing and a rear radial bearing located in the cylinder head; said shaft having an intermediate portion thereon including a rear thrust shoulder and a front thrust shoulder;

said front thrust bearing having a radial race in contact with said front thrust shoulder during all modes of compressor operation and in contact with said sleeve when the wobble plate is in its full stroke inclination with respect to said drive shaft;

said shaft having a rear extension with first, second and third diameter surfaces thereon; said first diameter surface supported within said rear radial bearing and said second diameter surface supported within said rear thrust bearing;

said rear thrust bearing having a bearing sleeve press fit on said second diameter and having axial extensions thereon in engagement with said shaft at said third diameter;

said rear thrust bearing having a radial race with an inside diameter surface supported on said second diameter surface and said radial race including slots in the inside diameter surface for receiving said axial extensions to guide said radial race for limited axial movement with respect to said shaft to compensate for shaft end play when said drive shaft is assembled between the cylinder head and the front head as they are joined to each other;

said spring means including a single coil spring surrounding said shaft and having on ®end thereof in engagement with said rear thrust shoulder and having the opposite end thereof in engagement with said radially directed race;

said coil spring and said rear thrust bearing being operatively associated to provide relative axial movement between said shaft and said rear thrust bearing to shift said drive shaft in a direction toward said front thrust bearing when the cylinder head and the front head are assembled to compensate for shaft end play and to direct a minimal spring bias on said front and rear thrust bearings during periods when the wobble plate is in its full stroke position.

4. In a variable capacity compressor having a wobble plate and a drive mechanism for coupling the wobble plate to a drive shaft supported between a cylinder head and a front head joined together to form a crankcase for the drive mechanism and in which pressure is controlled in response to operating conditions within an associated vehicle air conditioning system; the air conditioning system having a high demand mode of operation in which the crankcase pressure is controlled to cause the wobble plate to assume a full stroke position with respect to the drive mechanism and the drive shaft and the air conditioning system further having a low demand mode of operation in which the crankcase pressure is controlled to cause the wobble plate to assume a destroke position in which the compressor displacement is reduced the improvement comprising:

a shaft support assembly including spring means for resiliently supporting the drive shaft between the cylinder head and the front head;

said shaft support assembly including a front thrust bearing located in the front head and a rear thrust bearing and a rear radial bearing located in the cylinder head; said shaft having an intermediate portion thereon including a rear thrust shoulder and a front thrust shoulder; a front radial bearing;

said front thrust bearing having a radial race in contact with said front thrust shoulder during all modes of compressor operation;

said shaft having a rear extension with first, second and third diameter surfaces thereon; said first diameter surface supported within said rear radial bearing and said second diameter surface supported within said rear thrust bearing;

said rear thrust bearing having a bearing sleeve press fit on said second diameter and having axial extensions thereon in engagement with said shaft at said third diameter;

said rear thrust bearing having a radial race with an inside diameter surface supported on said second diameter surface and said radial race including slots in the inside diameter surface for receiving said axial extensions to guide said radial race for limited axial movement with respect to said shaft to compensate for shaft end play when said drive shaft is assembled between the cylinder head and the front head as they are joined to each other;

said spring means including a single coil spring surrounding said shaft and having one end thereof in engagement with said rear thrust shoulder and having the opposite end thereof in engagement with said radially directed race;

said coil spring and said rear thrust bearing being operatively associated to provide relative axial movement between said shaft and said rear thrust bearing to shift said drive shaft in a direction toward said front thrust bearing when the cylinder head and the front head are assembled to compensate for shaft end play; and said drive mechanism including a sleeve moveable axially on said shaft for compressing said coil spring when the wobble plate is in its destroke position under low demand air conditioning operation to direct a spring bias against said shaft of a magnitude to counteract load reversals imposed on said shaft when the compressor is operated under a low demand mode of air conditioning operation.

* * * * *